UNITED STATES PATENT OFFICE.

MARY HANSON COLAHAN, OF CHICAGO, ILLINOIS.

SOLVENT TO BE USED IN EFFECTING THE INCIPIENT SUBDIVISION AND DECOMPOSITION OF THE SEMI-LIGNEOUS CAMBIUM LAYER AND EPIDERMIS OF BAST FIBERS.

No. 806,954.　　　Specification of Letters Patent.　　　Patented Dec. 12, 1905.

Application filed April 15, 1905. Serial No. 255,780.

*To all whom it may concern:*

Be it known that I, MARY HANSON COLAHAN, a citizen of the United States, residing at Chicago, county of Cook, and State of Illinois, have invented new and useful improvements in producing a solvent to be used in a process for effecting the incipient subdivision and decomposition of the semiligneous cambium layer and epidermis of bast fibers, of which the following is a specification.

My invention consists of producing this solvent fluid substance at very little expense, as its use requires large quantities and must be cheap in order to be available for the purposes desired.

I find among the waste products arising from the manufacture and distillation of petroleum a residuum that escapes from the sludge-oil, which residuum is a waste and of no value hitherto, it being discharged in the sewers. This waste is in the water that has been used in the washing of the sludge-oil in the recovery of the sulfuric acid and contains traces of the elements that have been used. From the treatment of the paraffin-oils there is also a waste discharge known as "spent soda," which is not now utilized, it being also discharged in the sewer. These two waste liquids I now combine in about equal proportions and apply a heat of 212° Fahrenheit, when their particles blend and unite and in so doing form a new and valuable solvent that is certain, sure, and effective in its use, and by being obtained from the above-named sources it can be produced in large quantities without cost, only of the necessary heating to blend the ingredients thereof.

I claim—

1. The process of making a solvent by combining the discharge waste and refuse of sludge-oil with the discharge waste of the spent soda of the paraffin-oils, and blending and uniting the same as a compound by the application of heat of 212° Fahrenheit, substantially as shown and described.

2. As a new solvent, the product obtained by the combination of the discharge waste and refuse of sludge-oil with the discharge waste of the spent soda of the paraffin-oils blended and united as a compound by the application of heat 212° Fahrenheit, substantially as shown and described.

MARY HANSON COLAHAN.

Witnesses:
CHARLES COLAHAN,
F. S. PEDERSEN.